United States Patent
Higo et al.

(10) Patent No.: US 8,252,111 B2
(45) Date of Patent: Aug. 28, 2012

(54) HEAVY CONCRETE

(75) Inventors: Yasuhide Higo, Sakura (JP); Minoru Yoshimoto, Sakura (JP); Takeshi Hamada, Tokyo (JP); Eichi Manabe, Sakura (JP)

(73) Assignee: Taiheiyo Cement Corporation, Tokyo (JP)

( * ) Notice: Subject to any disclaimer, the term of this patent is extended or adjusted under 35 U.S.C. 154(b) by 203 days.

(21) Appl. No.: 12/743,164

(22) PCT Filed: Jan. 26, 2009

(86) PCT No.: PCT/JP2009/051192
§ 371 (c)(1),
(2), (4) Date: May 14, 2010

(87) PCT Pub. No.: WO2009/096359
PCT Pub. Date: Aug. 6, 2009

(65) Prior Publication Data
US 2010/0282130 A1 Nov. 11, 2010

(30) Foreign Application Priority Data
Jan. 29, 2008 (JP) ................. 2008-018107

(51) Int. Cl.
*C04B 18/14* (2006.01)
(52) U.S. Cl. ........................................ 106/789
(58) Field of Classification Search ............ 106/789
See application file for complete search history.

(56) References Cited

U.S. PATENT DOCUMENTS
2006/0243168 A1 11/2006 Burdin et al.

FOREIGN PATENT DOCUMENTS

| JP | 06 122538 | 5/1994 |
|---|---|---|
| JP | 2004 091324 | 3/2004 |
| JP | 2004 210574 | 7/2004 |
| JP | 2007 008758 | 1/2007 |
| JP | 4044956 | 2/2008 |
| WO | 2008 062580 | 5/2008 |

*Primary Examiner* — Paul Marcantoni
(74) *Attorney, Agent, or Firm* — Oblon, Spivak, McClelland, Maier & Neustadt, L.L.P.

(57) ABSTRACT

It is aimed at providing a heavy concrete, which does not require addition of a thickener such as methyl cellulose, which is less in segregation between a heavy aggregate and a cement paste, and which is high in flowability and excellent in construction ability. The present invention provides a heavy concrete comprising, at least, a cement, a heavy aggregate, and water, mixed with one another, characterized in that the heavy fine aggregate includes hot scarves brought about in a scarfing process of a steel slab surface. The present invention further provides the above-described heavy concrete characterized in that the heavy fine aggregate includes fine aggregate particles passing through a sieve having a nominal size of 0.15 mm, in an amount of 10% to 20% in mass percentage, and the heavy fine aggregate includes spherical particles each having a distortion irregularity of 3.3 or less as defined below, in an amount of 20% or more in the whole of particles having diameters between 50 μm inclusive and 5 mm inclusive in the heavy fine aggregate:

[Distortion irregularity]=[Length of circumferential outline of particle]/[Diameter of true circle having the same area as the area of the particle providing the outline].

7 Claims, 1 Drawing Sheet

EXAMPLE 2    COMPARATIVE EXAMPLE 3

HEAVY CONCRETE

TECHNICAL FIELD

The present invention relates to a heavy concrete to be used for a wave-dissipating block, a radiation shielding wall, and the like, and particularly to a heavy concrete configured to exhibit a higher flowability without segregation between a heavy aggregate and a cement paste.

BACKGROUND ART

The heavy concrete refers to a concrete having a larger weight per unit volume than a typical one, and is used as a wave-dissipating block, a concrete for a river/sea wall, a radiation shielding wall, a bridge weight, and the like. Although iron ores such as magnetite and hematite have been frequently used as heavy aggregates to be used in heavy concretes, it is gradually becoming difficult to obtain high-quality ones as heavy aggregates, and usage of valuable natural resources are undesirable from an economical standpoint as well as an environment-conscious standpoint. Further, heavy concretes have been proposed which utilize coarse particle components sieved from steelmaking converter dusts, as fine aggregates instead of iron ore aggregates, for example (see Patent Document 1).

However, in case of adopting the iron ores as heavy aggregates and in case of adopting the alternatives such as coarse particle components of steelmaking converter dusts as heavy aggregates, such a problem has been caused that segregation is likely to occur between a heavy aggregate and a cement paste due to a large difference of specific gravity therebetween. As such, there has been conventionally conducted addition of a thickener such as methyl cellulose into a heavy concrete, so as to restrict a segregation between a heavy aggregate and a cement paste (see upper left column on page 3 of Patent Document 2, for example). However, addition of a thickener delays a hydration reaction of a cement, so that addition of the thickener in a large amount is undesirable. Thus, there has been demanded a heavy concrete, which does not require addition of a thickener such as methyl cellulose, which is less in segregation between a heavy aggregate and a cement paste, and which is high in flowability and excellent in construction ability.
Patent Document 1: JP-5-319880A
Patent Document 2: JP-62-158181A

DISCLOSURE OF INVENTION

Problem to be Solved by the Invention

Thus, the present invention aims at providing a heavy concrete, which does not require addition of a thickener such as methyl cellulose, which is less in segregation between a heavy aggregate and a cement paste, and which is high in flowability and excellent in construction ability.

Means for Solving Problem

The present invention provides a heavy concrete comprising, at least, a cement, a heavy aggregate, and water, mixed with one another, characterized in that the heavy fine aggregate includes hot scarves brought about in a scarfing process of a steel slab surface.

Further, the present invention provides the heavy concrete characterized in that the heavy fine aggregate includes fine aggregate particles passing through a sieve having a nominal size of 0.15 mm, in an amount of 10% to 20% in mass percentage, and the heavy fine aggregate includes spherical particles each having a distortion irregularity of 3.3 or less as defined below, in an amount of 20% or more in the whole of particles having diameters between 50 μm inclusive and 5 mm inclusive in the heavy fine aggregate:

[Distortion irregularity]=[Length of circumferential outline of particle]/[Diameter of true circle having the same area as the area of the particle providing the outline].

Furthermore, the present invention provides the heavy concrete, characterized in that the heavy coarse aggregate includes artificial stones produced by melting wastes including dusts generated in a steelmaking process.

Moreover, the present invention provides a hardened heavy concrete body obtained by hardening the heavy concrete of any one of the above.

Effect of the Invention

The heavy concrete of the present invention is capable of exhibiting a higher flowability, while restricting a segregation between a cement paste and an aggregate which restriction has been conventionally considered to be difficult insofar as without addition of a thickener in a large amount. This exemplarily avoids a material segregation and thus avoids occurrence of clogging within a pipe upon pressure-feeding a heavy concrete through the pipe. Further, by virtue of the unnecessity of a thickener in a large amount, higher feeding pressures are unrequired, thereby enabling to improve a construction ability and to decrease a constructional labor and a cost. Moreover, the heavy concrete is improved in filling ability into a mold in a manner to attain a higher density and to restrict a material segregation, thereby enabling to be provided as a more homogeneous heavy concrete.

BEST MODE(S) FOR CARRYING OUT THE INVENTION

Figure 1:
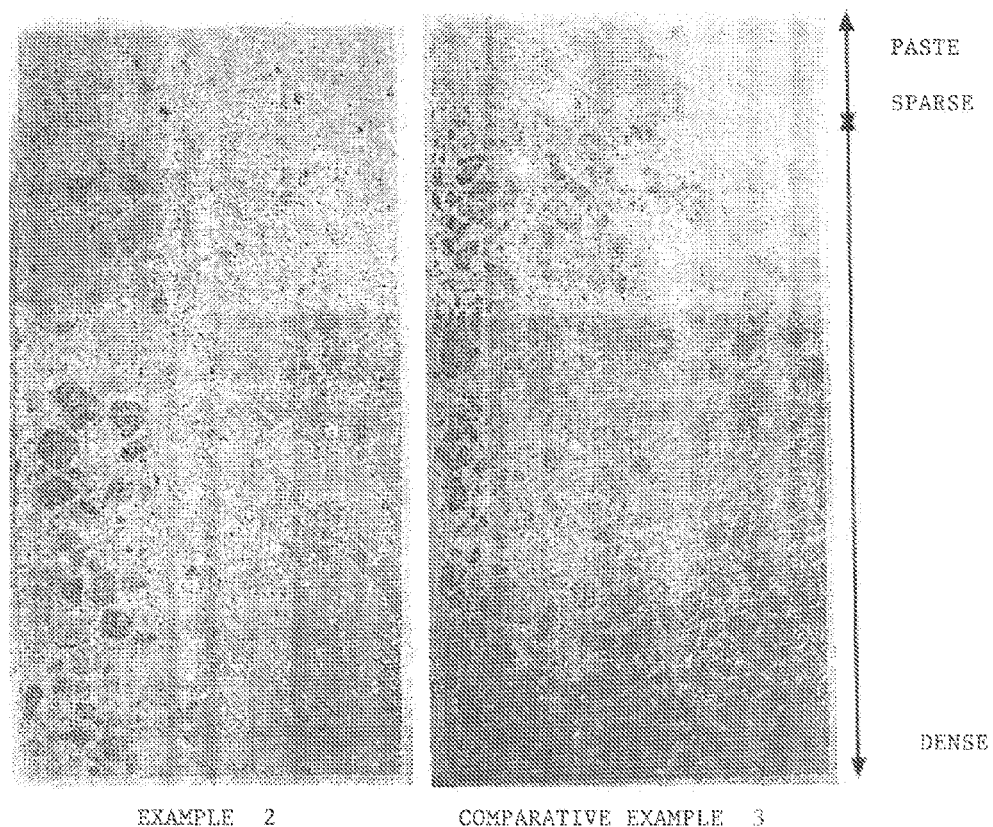
FIG. 1 is a photographic longitudinal cross-sectional view of heavy concrete specimens, including a left-half for Example 2 and a right-half for Example 3 (Test 3)

The present invention will be explained in detail for a heavy concrete thereof. The "heavy concrete" in the present invention may or may not contain a coarse aggregate. Namely, the "heavy concrete" in the present invention is to be used in a broad concept embracing even a "heavy mortar" containing no coarse aggregates, unless otherwise particularly mentioned. Further, although the "heavy aggregate" in the present invention is to be used in a concept embracing a heavy fine aggregate and a heavy coarse aggregate, this term refers to a heavy fine aggregate when the "heavy concrete" means a heavy mortar. Heavy aggregates refer to those having densities higher than typical aggregates, and shall refer to aggregates having saturated surface-dry densities of 4.0 g/cm$^3$ or more, in the present invention. Only, such an aggregate, including an additional aggregate having a saturated surface-dry density lower than 4.0 g/cm$^3$, shall be regarded as a heavy aggregate, insofar as the combined aggregates cooperatively have a saturated surface-dry density of 4.0 g/cm$^3$ or more as a whole.

The heavy concrete of the present invention is characterized in that the same contains, as a heavy fine aggregate, hot scarves brought about in a scarfing process of a steel slab surface. Hot scarves are recycle materials brought about in a process for scarfing and removing inclusions such as Al continuously deposited on a longitudinal surface layer portion of a steel slab due to an inflow of molten steel into a mold in case of casting of the steel slab by continuous casting, and such hot scarves contain iron oxides as main constituent components, thereby possessing a saturated surface-dry density of 4.8 g/cm³ or more which is sufficient for usage as a heavy aggregate. Further, hot scarves are once melted into a liquid state in a scarfing process and then cooled and solidified in air, so that the hot scarves are constituted of particles in nearly spherical shapes each having a minimum surface area per unit volume or constituted of pulverized bodies or agglomerates of such particles, in a manner that spherical particles are included in an amount of 70% or more. Further, hot scarves are free of deviation in grain size distribution, so that adoption of hot scarves as a heavy fine aggregate enables to obtain a heavy concrete exhibiting a higher flowability while restricting a material segregation.

However, since hot scarves are not much in generated amount as recycle materials, it is preferable to utilize the former mixedly with other recycle materials or the like. Preferable examples of materials to be used mixedly with hot scarves include steelmaking recycle materials having larger saturated surface-dry densities such as: coarse particle components separated by a sieve of 50 μm from steelmaking converter dusts; pig iron particles separated from blast furnace granulated slags in a pulverizing process; and mill scales brought about in a rolling process of steelmaking. However, even those materials such as electric arc furnace oxidizing slags, manufactured sands, and the like, which have saturated surface-dry densities of 4 g/cm³ or less, will do insofar as they are turned to be heavy fine aggregates by satisfying the above-mentioned requirements as heavy fine aggregates after mixing.

When a heavy fine aggregate after mixing satisfies the following conditions, it is possible to obtain a heavy concrete exhibiting a particularly higher flowability while restricting a material segregation. Namely, such a heavy fine aggregate is to preferably include fine aggregate particles passing through a sieve having a nominal size of 0.15 mm, in an amount of 10% to 20%, particularly preferably 12% to 18% in mass percentage, and the heavy fine aggregate is to preferably include spherical particles in an amount of 20 number % or more, more preferably 25 number % or more, and particularly preferably 30 number % or more, in the whole of particles having diameters between 50 μm inclusive and 5 mm inclusive in the heavy fine aggregate. Here, the value in the unit of "number %" is to be obtained by: visually inspecting a scanning electron microscope (SEM) image; arbitrarily selecting 100 particles therefrom having average particle diameters between 50 μm inclusive and 5 mm inclusive; counting the number of spherical particles among them; and mathematically dividing the counted number by the number of selected all particles. Here, the "averaged particle diameter" of a particle, particularly a particle which is not spherical, is to be obtained as an averaged value, by measuring a diameter length of each particle in the SEM image at arbitrary three locations of the particle.

Herein, the "spherical particle" refers to a particle having a distortion irregularity of 3.3 or less as defined by the following formula:

[Distortion irregularity]=[Length of circumferential outline of particle]/[Diameter of true circle having the same area as the area of the particle providing the outline]

Namely, particles are visually inspected by images of a scanning electron microscope (SEM), to exclude those particles therefrom which are judged to be disk-like or hemi-spherical shapes, and the particles apparently having nearly spherical shapes are analyzed by image processing. The image processing may be conducted by adopting a typical image processing software (such as "Adobe Photoshop"). Then, shadows are erased from an image of a nearly spherical particle to form a graphic figure having an outline only, and to obtain an area and a length of circumferential outline of the graphic figure. Further, the graphic figure is approximated to a circle (i.e., there is assumed a circle having the same area as the graphic figure), and there are then obtained a radius "r" from the area $\pi r^2$ of the circle, and a diameter which is two times the radius. As outlines become closer to circles, i.e., as particles become closer to spherical shapes, ratios of circumferential lengths to diameters are decreased, and the ratios are brought to have values close to a circle ratio $\pi$.

Further, it is preferable in the present invention that the heavy fine aggregate include heavy fine aggregate particles passing through a sieve having a nominal size of 1.2 mm, in an amount of 70% to 90% in mass percentage, because the above effect is exhibited then. Shown in Table 1 is an example of an optimum grain size distribution of the heavy fine aggregate.

TABLE 1

| | Mass percentage (%) of matter passing through sieve | | | | | |
|---|---|---|---|---|---|---|
| | 5 mm | 2.5 mm | 1.2 mm | 0.6 mm | 0.3 mm | 0.15 mm |
| Heavy fine aggregate of present invention | 97-100 | 90-98 | 70-90 | 45-70 | 20-50 | 10-20 |

In case of coarse powder components sievedly caught at 50 μm from steelmaking converter dusts, it is preferable to mix up to 30 parts of coarse converter dust powders with down to 70 parts of hot scarves in volume ratio. Mixing more parts of coarse converter dust powders occasionally results in that particles passing through a sieve having a nominal size of 0.15 mm are included in an amount exceeding 20% in mass percentage in the whole of particles of the mixture, so that sufficient mortar flows are not possibly obtained.

In turn, also pig iron particles separated from blast furnace granulated slags in a pulverizing process, include metal iron as main components, exhibit saturated surface-dry densities of 4.8 g/cm³ or more, and include about 50% of particles having substantially spherical shapes, so that the pig iron particles are recycle materials which can be used by mixing them with hot scarves. It is preferable to mix up to 30 parts of pig iron particles with down to 70 parts of hot scarves in volume ratio. Mixing more parts of pig iron particles occasionally results in that particles passing through a sieve having a nominal size of 0.15 mm are included in an amount less than 10% in mass percentage in the whole of particles of the mixture, so that sufficient mortar flows are not possibly obtained.

In case of mill scales as recycle materials brought about in a rolling process of steelmaking, it is preferable to mix up to 70 parts of mill scales with down to 30 parts of hot scarves in volume ratio. Mixing more amounts of mill scales occasionally results in ratios of spherical particles less than 20 number % to fail to ensure flowabilities, thereby possibly failing to obtain sufficient mortar flows.

Although it is possible to use a conventional iron ore as the heavy coarse aggregate to be used in the heavy concrete of the present invention, usage of valuable natural resources are undesirable from an economical standpoint as well as an environment-conscious standpoint. It is also possible to adopt coarse aggregates made of electric arc furnace oxidizing slags. Namely, it is one of the objects of the present invention to utilize those resources which are not sufficiently utilized from an industrial standpoint, and it is thus preferable to utilize artificial stones produced by melting wastes including dusts generated in a steelmaking process. Particularly, those artificial stones, produced by mixing dusts generated in steelmaking processes with reduced slags made into powdery states, by heating and melting the mixtures, and by cooling and solidifying them, have been already subjected to removal of free lime, low-boiling metal oxides, and the like in melting processes, and also have densities sufficient as heavy coarse aggregates, respectively, so that such artificial stones are particularly effective as the coarse aggregate to be used in the heavy concrete of the present invention. Further, in case of usage where the weight per unit volume of the heavy concrete is not required to be so large, it is possible to use a coarse aggregate having a lower density such as crushed stones or the like in a manner to be mixed with the heavy coarse aggregate.

Examples of a cement to be used in the heavy concrete of the present invention include: various Portland cements such as normal Portland cement, high-early-strength Portland cement, moderate heat Portland cement, and low-heat Portland cement; various blended cements such as Portland blast furnace slag cement, and fly ash cement; Eco-cement; and the like.

The heavy concrete of the present invention can be produced by the same method as a typical concrete. Namely, it is enough to mix the heavy fine aggregate, the heavy coarse aggregate, and the cement with one another, and knead them with addition of water. It is possible to add thereto an admixture such as a water reducing agent, anti-foaming agent, or the like, as required. To ensure a higher density of the heavy concrete, it is preferable to lower its water content per unit volume and to add a water reducing agent thereto. Usable examples of the water reducing agent include: water reducing agents based on lignin, naphthalene sulfonic acid, melamine, polycarboxylic acid; an AE water reducing agent; a high-performance water reducing agent; or a high-performance AE water reducing agent. Among them, it is preferable to use the high-performance water reducing agent and high-performance AE water reducing agent, each having an enhanced water reducing effect. Further, when it is required to restrict trapping of air so as to ensure a higher density, it is possible to add an anti-foaming agent.

It is possible to appropriately select a fine aggregate/coarse aggregate volume ratio, a water content per unit volume, and a water-cement ratio, in conformity to usage. In case of pressure-feeding the concrete by a pump for a site construction, there is exemplarily conducted: a blending for a wet consistency where a slump is made to be 18 cm or more upon completion of the mixing; or a blending where a slump flow is made to be 50 to 60 cm. According to the present invention, it is possible to attain a slump of 18 cm or more and a slump flow of 50 to 60 cm of a concrete while restricting a material segregation therein, by exemplarily and appropriately adjusting a fine aggregate/coarse aggregate volume ratio within a range of 0.4 to 0.8, a water content per unit volume within a range of 160 to 200 kg/m$^3$, and a water-cement ratio within a range of 30 to 55%. Further, in case of conducting casting and vibration molding at a concrete product factory, it is possible to obtain a higher filling ability by achieving a slump of about 8 to 18 cm. According to the present invention, it is possible to attain a slump of 8 to 18 cm of a concrete while restricting a material segregation therein, by exemplarily and appropriately adjusting a fine aggregate/coarse aggregate volume ratio within a range of 0.4 to 0.7, a water content per unit volume within a range of 140 to 200 kg/m$^3$, and a water-cement ratio within a range of 30 to 55%. Note that the "water-cement ratio" will defined as follows:

$$[\text{Water-cement ratio (\%)}]=100\times[\text{mass of water}]/[\text{mass of cement}]$$

In case that the heavy concrete of the present invention is a heavy mortar, the heavy mortar can be produced by the same method as the heavy concrete including the above-described heavy coarse aggregate except that the heavy coarse aggregate is not mixed nor included for the heavy mortar, and it is then possible to appropriately select a water content per unit volume, a water-cement ratio, and the like in conformity to the usage. Although it is enough to increase a water content per unit volume and a water-cement ratio for a higher flowability of mortar, it is required to lower a water content per unit volume and a water-cement ratio of a heavy mortar for an increased density of the heavy mortar. Nonetheless, it is possible according to the present invention to obtain a sufficiently higher flowability and a sufficiently enhanced material segregation resistance, even with such a water content per unit volume of 220 to 300 kg/m$^3$ and a water-cement ratio of 30 to 60%, by adopting the above-described heavy fine aggregate.

The heavy concrete to be constructed at a site or to be flowed into a mold may be cured in the same manner as a typical concrete, by a curing method such as air curing, wet curing, and steam curing, thereby enabling to obtain a hardened concrete body. The heavy concrete of the present invention is allowed to be filled into a mold deeply to narrower spaces thereof without leaving any gaps by virtue of the higher flowability of the heavy concrete, and allows for restriction of a material segregation, thereby enabling to obtain a hardened heavy concrete body of a high quality, which is free of cavities, aggregate deviations, and the like.

EXAMPLES

Although the present invention will be specifically described with reference to Examples and Comparative Examples, the present invention is not limited to these Examples insofar as within the scope of the present invention.

(Tested Material)

Used as a cement (hereinafter indicated as "C", when abbreviated) was a normal Portland cement manufactured by Taiheiyo Cement Corporation. Used as fine aggregate (hereinafter indicated as "S", when abbreviated) were those listed in Table 2. Used as a coarse aggregate (hereinafter indicated as "G", when abbreviated) was an artificial stone produced by melting an electric arc furnace dust: DSM2005 (saturated surface-dry density: 4.13 g/cm$^3$) manufactured by DAIDO Technica Co., Ltd. (sold by Taiheiyo Cement Corporation). Further, used as an admixture was an AE water reducing agent (Pozzolith No. 70; manufactured by BASF Pozzolith Ltd.; hereinafter indicated as "AD", when abbreviated) for a slump formulation, or a high-performance AE water reducing agent (Rheobuild SP-8SV; manufactured by BASF Pozzolith Ltd.; hereinafter indicated as "SP", when abbreviated) for a slump flow formulation.

TABLE 2

| | Fine aggregate | Abbreviation | Saturated surface-dry density (g/cm³) | Mass percentage (%) of matter passing through sieve | | | | | | | Spherical particle ratio (%) |
|---|---|---|---|---|---|---|---|---|---|---|---|
| | | | | 10 mm | 5 mm | 2.5 mm | 1.2 mm | 0.6 mm | 0.3 mm | 0.15 mm | |
| Ex. 1 and 2 | 50/50 mixture of hot scarf and mill scale | S0 | 4.98 | | 98 | 92 | 74 | 49 | 27 | 11 | 37 |
| Com. Ex. 1 and 3 | Magnetite 10-0 mm | S1 | 4.50 | 99 | 77 | 56 | 39 | 26 | 16 | 7 | <1 |
| Com. Ex. 2 and 4 | Converter dust | S2 | 5.84 | | 100 | 97 | 96 | 92 | 75 | 34 | 73 |

Note:
Magnetite particles having diameters of 5 mm or larger are regarded as a coarse aggregate.

In the table, the item of "spherical particle ratio (%)" means the above-described "ratio of spherical particle". Namely, this item indicates a percentage in number of spherical particles in the whole of particles having diameters between 50 μm inclusive and 5 mm inclusive in the fine aggregate.

Test 1:
(Testing Method)
(1) Applicable materials were mixed with one another and kneaded into a concrete, in a slump formulation listed in Table 3. Here, "W" denotes water, and "W/C" denotes a "water-cement ratio". "W/C" was made to be 50% in mass % ratio.

(2) The slump test for each concrete was conducted based on JIS A 1101, in a manner to: place a slump cone (inner diameter of 100 mm at upper end; inner diameter of 200 mm at lower end; and height of 300 mm) onto a flat and smooth plate installed horizontally; fill the concrete into the slump cone; flatten the upper end of the former; immediately thereafter, softly and vertically pull up the slump cone; and measure a lowering (i.e., reduction in height) at a central portion of the concrete in a unit of 0.5 cm, to regard the measured value as a "slump".

(Test Result)
Measurement results of slumps are also listed in Table 3.

TABLE 3

| | W/C (%) | Unit amount (kg/m³) | | | | | | | Slump (cm) |
|---|---|---|---|---|---|---|---|---|---|
| | | W | C | S0 | S1 | S2 | G | AD | |
| Ex. 1 | 50 | 175 | 350 | 1534 | | | 1553 | 0.875 | 13.0 |
| Com. Ex. 1 | 50 | 175 | 350 | | 1787 | | 1185 | 0.875 | 0.5 |
| Com. Ex. 2 | 50 | 175 | 350 | | | 1799 | 1553 | 0.875 | 1.0 |

Note:
Blending calculation was conducted by regarding magnetite particles (Comparative Example 1) having diameters of 5 mm or larger, as a coarse aggregate.

As listed in Table 3, while the heavy concrete of the present invention (Example 1) allowed for obtainment of a slump of 13.0 cm, the heavy concretes produced by adopting conventional heavy fine aggregates in the similar blending were extremely low in flowability such that Comparative Example 1 adopting magnetite exhibited a slump of 0.5 cm and Comparative Example 2 adopting a converter dust coarse particle component exhibited a slump of 1.0 cm. As a result, it has been proven that the heavy concrete of the present invention possesses an extremely higher flowability as compared to the conventional heavy concretes.

Test 2:
(Testing Method)
(1) Applicable materials were mixed with one another and kneaded into a concrete, in a slump flow formulation listed in Table 4. "W/C" was made to be 37% in mass % ratio.

(2) The slump flow test for each concrete was conducted based on JIS A 1150, in a manner to: fill the concrete into the slump cone in the same manner as the slump test; vertically pull up the slump cone; and after termination of movement of the concrete, measure a diameter of the concrete where it was spread maximally, and another diameter of the concrete in a direction orthogonal to that of the former diameter. Further, each concrete was subjected to a visual inspection of a state of material segregation at that time.

(Test Result)
Measurement results of slump flows and presence/absence of material segregation are listed in Table 4.

TABLE 4

| | W/C (%) | Unit amount (kg/m³) | | | | | | | Slump flow (cm) | Material segregation |
|---|---|---|---|---|---|---|---|---|---|---|
| | | W | C | S0 | S1 | S2 | G | SP | | |
| Ex. 2 | 37 | 175 | 473 | 1609 | | | 1330 | 7.10 | 50-48 | none |
| Com. Ex. 3 | 37 | 185 | 500 | | 1751 | | 983 | 8.50 | 45-43 | notable |
| Com. Ex. 4 | 37 | 185 | 500 | | | 1834 | 1293 | 8.00 | 55-53 | notable |

Note:
Blending calculation was conducted by regarding magnetite particles (Comparative Example 3) having diameters of 5 mm or larger, as a coarse aggregate.

As listed in Table 4, applicable materials in all Example and Comparative Examples were adjustedly blended with one another so as to attain a slump flow of about 50 cm. To increase a flowability, each Comparative Example was prepared to include more amounts of the applicable materials as compared to Example, by 10 kg/m³ for a water content per unit volume, by 27 kg/m³ for a paste component (cement), and by 1.4 kg/m³ in Comparative Example 3 and 0.9 kg/m³ in Comparative Example 4 for a high-performance AE water reducing agent. Although the concrete of Example was spread without segregation between the aggregate and the cement paste, the materials were notably segregated in each Comparative Example such that the aggregate was left at the center of the concrete and only the cement paste was spread out.

Test 3:

(Testing Method)

The applicable concretes kneaded up in Test 2 were each: delivered into a cylindrical vessel having an inner diameter of 15 cm and a height of 30 cm; subjected to vibrating compaction by a table vibrator for 20 seconds; and hardened for 14 days by air curing; and then, each specimen was cut in a vertical direction to observe a distributed state of the aggregate within the hardened body, thereby confirming presence/absence of material segregation.

(Test Result)

As representatives, FIG. 1 shows photographs of longitudinal cross-sections of specimens of Example 2 and Comparative Example 3.

As apparent from FIG. 1, although the aggregate was homogeneously distributed over the specimen of Example, the aggregate and paste were segregated from each other to a bottom portion and an upper portion, respectively, in the specimen of Comparative Example.

Although it has been confirmed that a material segregation is remarkably restricted in the heavy concrete including hot scarves as noted above, the following tests were conducted about a flowability of a heavy mortar including no coarse aggregates so as to ascertain a more preferable condition.

Test 4:

(Testing Method)

(1) Mutually and variously mixed were hot scarves having a saturated surface-dry density of 5.08 g/cm³ and including spherical particles in an amount of about 75 number %, and coarse converter dust powders having a saturated surface-dry density of 5.84 g/cm³ and including spherical particles in an amount of about 73 number %, thereby preparing mixed sands 1 to 4 having particle size distributions listed in Table 5. For example, the mixed sand 2 had a mixing volume ratio of "hot scarf 70:coarse converter dust powder 30". Here, each "mixed sand" was a "heavy fine aggregate".

(2) Mixed into each of the mixed sands prepared in step (1) was a normal Portland cement at a sand-cement volume ratio of 3.19, followed by kneading after addition of 4.37 kg/m³ of a high-performance AE water reducing agent (air entraining and water reducing agent) based on polycarboxylic ether, 0.22 kg/m³ of an anti-foaming agent, and 246 kg/m³ of water (water-cement ratio of 45.0%), per 547 kg/m³ of cement.

(3) Using a flow cone having a diameter of 100 mm and a height of 40 mm prescribed in the physical testing method of cement according to JIS R 5201, the mortars prepared in step (2) were each filled into the flow cone, followed by pull-up of the flow cone, to measure, as mortar flows, diameters at bottoms of the mortars after spreading thereof.

(Test Result)

Measurement results of mortar flows are listed in Table 5.

TABLE 5

| Sieve size | Mass percentage (%) of matter passing through sieve | | | | | | Mortar flow |
|---|---|---|---|---|---|---|---|
| (mm) | 5 | 2.5 | 1.2 | 0.6 | 0.3 | 0.15 | (mm) |
| Mixed sand 1 | 99 | 97 | 85 | 59 | 33 | 14 | 190 |
| Mixed sand 2 | 100 | 97 | 88 | 69 | 46 | 20 | 160 |
| Mixed sand 3 | 100 | 97 | 90 | 75 | 54 | 24 | 105 |
| Mixed sand 4 | 100 | 97 | 96 | 92 | 75 | 34 | 100 |

Seen from the results listed in Table 5 is that excellent mortar flows were obtained by the mixed sands 1 and 2, respectively. The mixed sand 4 included densely packed particles having small diameters such that even kneading was difficult and no flows of the mortar were found. The mixed sand 3 provided a slight mortar flow, and increase of a water-cement ratio up to 50% provided an increase of mortar flow up to 130 mm, though the details thereof are not shown. However, segregation was then caused between the aggregate and the cement paste. As described above, it has become apparent that remarkably significant effects can be obtained in mortar flows, by limiting particle size distributions of heavy fine aggregates such that particles passing through a sieve having a nominal size of 0.15 mm are included at 20% or less in mass percentage in the whole of particles.

Test 5:

(Testing Method)

(1) Mutually and variously mixed were hot scarves having a saturated surface-dry density of 5.08 g/cm³ and including spherical particles in an amount of 75 number %, and pig iron particles (magnetically separated from blast furnace granulated slags in a pulverizing process) having a saturated surface-dry density of 5.60 g/cm³ and including spherical particles in an amount of about 54 number %, thereby preparing mixed sands 5 to 10 having particle size distributions listed in Table 6. For example, the mixed sand 7 had a mixing volume ratio of "hot scarf 70:pig iron particle 30".

(2) Mixed into each of the mixed sands prepared in step (1) was a normal Portland cement at a sand-cement volume ratio of 3.19, followed by kneading after addition of 5.46 kg/m³ of a high-performance AE water reducing agent based on polycarboxylic ether, 0.22 kg/m³ of an anti-foaming agent, and 246 kg/m³ of water (water-cement ratio of 45.0%), per 547 kg/m³ of cement.

(3) Similarly to Test 4, mortar flows were measured.

(Test Result)

Measurement results of mortar flows are listed in Table 6.

TABLE 6

| Sieve size | Mass percentage (%) of matter passing through sieve | | | | | | Mortar flow |
|---|---|---|---|---|---|---|---|
| (mm) | 5 | 2.5 | 1.2 | 0.6 | 0.3 | 0.15 | (mm) |
| Mixed sand 5 | 99 | 97 | 85 | 59 | 33 | 14 | 190 |
| Mixed sand 6 | 100 | 98 | 87 | 58 | 30 | 12 | 180 |
| Mixed sand 7 | 100 | 98 | 87 | 58 | 28 | 10 | 150 |
| Mixed sand 8 | 100 | 98 | 88 | 57 | 26 | 9 | 130 |
| Mixed sand 9 | 100 | 98 | 91 | 56 | 21 | 6 | 125 |
| Mixed sand 10 | 100 | 99 | 93 | 54 | 16 | 2 | 115 |

Seen from the results listed in Table 6 is that excellent mortar flows were obtained by the mixed sands 5, 6, and 7, respectively. Contrary, flowabilities of mortars were apparently lowered in the mixed sands 8, 9, and 10. Further, slight segregation was caused between aggregates and cement pastes, in case of the mixed sands 9 and 10. As described above, it has become apparent that remarkably significant effects can be obtained in mortar flows, by limiting particle size distributions of heavy fine aggregates such that particles passing through a sieve having a nominal size of 0.15 mm are included at 10% or more in mass percentage in the whole of particles.

Test 6:

(Testing Method)

(1) Mutually mixed at various volume ratios were hot scarves having a saturated surface-dry density of 5.08 g/cm$^3$ and including spherical particles in an amount of about 75%, and mill scales constituted of flat particles having a saturated surface-dry density of 4.95 g/cm$^3$, thereby preparing mixed sands.

(2) Mixed into each of the mixed sands prepared in step (1) was a normal Portland cement at a sand-cement volume ratio of 2.68, followed by kneading after addition of 5.84 kg/m$^3$ of a high-performance AE water reducing agent based on polycarboxylic ether, 0.23 kg/m$^3$ of an anti-foaming agent, and 292 kg/m$^3$ of water (water-cement ratio of 50.0%), per 584 kg/m$^3$ of cement.

(3) Similarly to Test 4, mortar flows were measured.

(Test Result)

Figure 2:
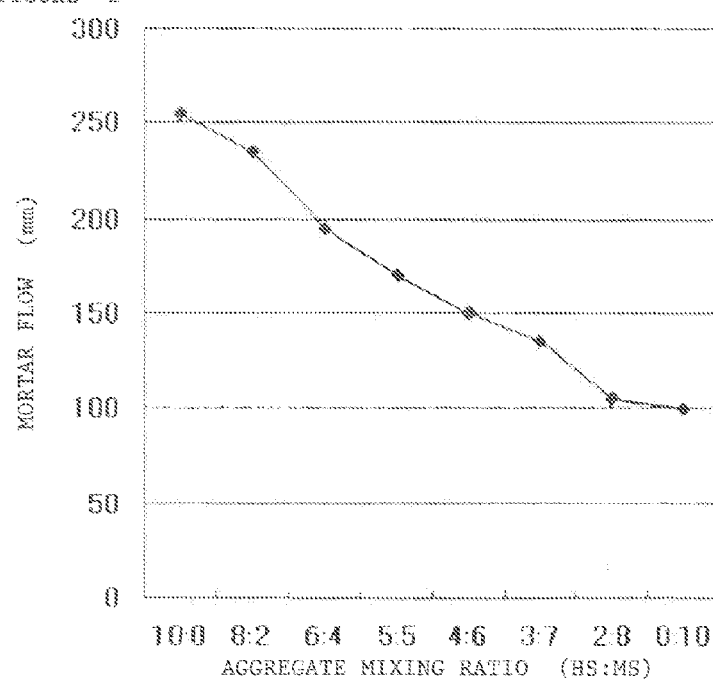
FIG. 2 is a graph of a relationship between: a mass mixing ratio of hot scarves (HS) and mill scales (MS); and a mortar flow (Test 6).

The measurement results of mortar flows are shown in FIG. 2. Mortar flow was hardly seen at a mixture ratio of 20:80 between hot scarves (HS) and mill scales (MS), and segregation was seen between the aggregate and the cement paste. Larger mixture ratios of hot scarves than 30:70 resulted in obtainment of excellent mortar flows. At this time, ratios of spherical particles were 20 number % or more.

INDUSTRIAL APPLICABILITY

The heavy concrete of the present invention is widely utilizable in an application of heavy concrete requiring a heavier weight per unit volume than typical concretes, and is particularly valuable in an application requiring a higher construction ability such as a pressure-feeding ability by a pump.

The present application is based on Japanese patent application No. 2008-018107 filed on Jan. 29, 2008, and the contents thereof are incorporated herein in its entirety by reference, as the disclosure of the specification of the present application.

The invention claimed is:

1. A heavy concrete comprising, a cement;

a heavy aggregate; and water, mixed with one another, wherein the heavy aggregate comprises at least one hot scarf, obtained by a process comprising scarfing a steel slab surface, wherein the heavy aggregate has a density higher than conventional aggregates in concrete and has a saturated surface dry density of 4.0 g/cm$^3$ or more.

2. The heavy concrete according to claim 1, wherein the heavy aggregate comprises at least one aggregate particle which passes through a sieve having a nominal size of 0.15 mm, in an amount of 10% to 20% in mass percentage, and the heavy aggregate comprises at least one spherical particle having a distortion irregularity of 3.3 or less, in an amount of 20% or more in the whole of particles having diameters of 50 μm to 5 mm in the heavy aggregate.

3. The heavy concrete according to claim 1, wherein the heavy aggregate comprises at least one artificial stone produced by melting waste comprising at least one dust generated in a steelmaking process.

4. A hardened heavy concrete body obtained by hardening the heavy concrete according to claim 1.

5. The heavy concrete according to claim 2, wherein the heavy aggregate comprises at least one artificial stone produced by melting waste comprising at least one dust generated in a steelmaking process.

6. A hardened heavy concrete body obtained by hardening the heavy concrete according to claim 2.

7. A hardened heavy concrete body obtained by hardening the heavy concrete according to claim 3.

* * * * *